(12) United States Patent
Deighton (10) Patent No.: US 11,445,123 B2
(45) Date of Patent: Sep. 13, 2022

(54) SYSTEM AND METHOD FOR PWM CONTROL OF A VIDEO DISPLAY SCREEN

(71) Applicant: Brompton Technology Ltd., London (GB)

(72) Inventor: Christopher Deighton, Chislehurst (GB)

(73) Assignee: Brompton Technology Ltd., London (GB)

( * ) Notice: Subject to any disclaimer, the term of this patent is extended or adjusted under 35 U.S.C. 154(b) by 0 days.

(21) Appl. No.: 17/486,412

(22) Filed: Sep. 27, 2021

(65) Prior Publication Data

US 2022/0103738 A1 Mar. 31, 2022

Related U.S. Application Data

(60) Provisional application No. 63/084,354, filed on Sep. 28, 2020.

(51) Int. Cl.
*H04N 5/235* (2006.01)
*G09G 3/32* (2016.01)
*G09G 5/10* (2006.01)

(52) U.S. Cl.
CPC ............ *H04N 5/2353* (2013.01); *G09G 3/32* (2013.01); *G09G 5/10* (2013.01); *G09G 2320/064* (2013.01)

(58) Field of Classification Search
CPC ...... G09G 3/32; G09G 2320/064; G09G 5/10; H04N 5/2353
See application file for complete search history.

(56) References Cited

U.S. PATENT DOCUMENTS

| 2010/0295767 A1* | 11/2010 | Lee | G09G 3/3611 |
| | | | 345/102 |
| 2014/0218416 A1* | 8/2014 | Suzuki | G09G 5/10 |
| | | | 345/690 |
| 2018/0255245 A1* | 9/2018 | Miyazawa | H04N 5/23254 |
| 2021/0295766 A1 | 9/2021 | Sugiyama et al. | |

FOREIGN PATENT DOCUMENTS

| EP | 3099058 A1 | 11/2016 |
| EP | 3496512 A1 | 6/2019 |
| WO | 2018164105 A1 | 9/2018 |

OTHER PUBLICATIONS

PCT International Search Report and PCT Written Opinion of the International Searching Authority; Application No. PCT/EP2021/076658; dated Jan. 24, 2022; 13 pages.

\* cited by examiner

*Primary Examiner* — Muhammad N Edun
(74) *Attorney, Agent, or Firm* — Conley Rose, P. C.; Brooks W Taylor (57) ABSTRACT

A PWM control system includes a memory and a processor. The processor obtains camera characteristics relating to a camera that is configured to capture an image displayed by a video display. The camera characteristics include a duration of a period when a shutter of the camera is open. The processor also calculates a PWM timing control for the video display. The PWM timing control specifies a PWM cycle duration that is based on the period when the shutter of the camera is open. The processor further sends a signal to the video display. The signal includes the PWM timing control and is configured to cause the video display to control a brightness of the video display according to the PWM timing control during the period when the shutter of the camera is open.

20 Claims, 4 Drawing Sheets

SYSTEM AND METHOD FOR PWM CONTROL OF A VIDEO DISPLAY SCREEN

CROSS-REFERENCE TO RELATED APPLICATIONS

This application claims priority to U.S. Provisional Application No. 63/084,354 filed on Sep. 28, 2020 by Christopher Deighton, entitled "System and Method for PWM Control of a Video Display Screen", which is incorporated by reference herein as if reproduced in its entirety.

TECHNICAL FIELD OF THE DISCLOSURE

The disclosure generally relates to light emitting diode (LED) video screens, and more specifically to a method for controlling a Pulse Width Modulation (PWM) refresh cycle of LEDs of the LED video screens to reduce visible artifacts when the screen is viewed by a camera.

BACKGROUND

LED video screens may use driver chips to control the LEDs of the LED video screens. These driver chips may adjust the brightness of individual LEDs using PWM, where an LED is switched between fully on (where a current is driven through the LED, emitting light at a full brightness) and fully off (where no current is driven through the LED and it emits no light). The ratio of the amount of time the LED is on to the amount of time it is off establishes an average brightness which may be seen by a human eye or a video camera. For example, if the LED is on for 50% of the time and off for 50% of the time, and the frequency of this changing is sufficiently fast not to be perceptible, then the LED will appear to be at 50% of the full brightness. When the viewer is the human eye, then this PWM frequency may be selected to be high enough that the eye sees the result as a dimmed constant light output rather than as flashing pulses.

SUMMARY

In a first embodiment, a PWM control system includes a memory configured to store instructions and a processor coupled to the memory and configured to execute instructions stored in the memory. The processor obtains camera characteristics relating to a camera that is configured to capture an image displayed by a video display. The camera characteristics include a duration of a period when a shutter of the camera is open. The processor also calculates a PWM timing control for the video display. The PWM timing control specifies a PWM cycle duration that is based on the period when the shutter of the camera is open. The processor further sends a signal to the video display. The signal includes the PWM timing control and is configured to cause the video display to control a brightness of the video display according to the PWM timing control during the period when the shutter of the camera is open.

In a second embodiment, a method of controlling PWM in a video display includes obtaining camera characteristics relating to a camera that is configured to capture an image displayed by the video display. The camera characteristics include a duration of a period when a shutter of the camera is open. The method also includes calculating a PWM timing control for the video display. The PWM timing control specifies a PWM cycle duration that is based on the period when the shutter of the camera is open. The method further includes sending a signal to the video display. The signal is configured to cause the video display to control a brightness of the video display according to the PWM timing control during the period when the shutter of the camera is open.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Described embodiments are illustrated in the figures, like numerals being used to refer to like and corresponding parts of the various drawings.

When the 'viewer' of a video display is a video camera—for example where the video display is providing imagery to be used as a background in a video shoot, or is providing other imagery such as advertising or message display screens in sports stadia—then it may be desirable to take the framerate and shutter (or shutter timing) speed of the video camera into account in determining PWM control signals to be used in controlling brightness of the video display. That is, a PWM control system according to the disclosure matches PWM control of a video display to one or more operational characteristics of one or more video cameras that are capturing what is displayed on the video display.

As used herein, the term PWM cycle indicates a digital waveform of chosen duration that may alternate between off ('0') and on ('1') states, with the time spent in each state controlled so as to achieve some desired average output value of the waveform between 0 and 1 inclusive (e.g. 0.25, or equivalently 25%). The term PWM duty cycle indicates the ratio of on time to the duration of a PWM cycle, thus also indicating the average output value during the PWM cycle. As used herein, a PWM control signal may include two types of PWM controls. A first type of PWM control is a PWM adjustment that may be applied to a PWM cycle or a PWM duty cycle. One example of such a PWM adjustment is a control value to compensate for changes in operating temperature of LEDs by adjusting the duty cycle to adapt to changes in the LEDs' efficiency. A second type of PWM control is a PWM timing control that may specify parameters such as a time the PWM cycle is to be initiated and/or a duration of the PWM cycle (or a period of time during which the PWM cycle completes).

Digital video and film cameras typically have a light sensitive sensor located behind a lens that focuses incoming light onto the sensor. Such a camera is typically configured for a desired camera framerate. For example, a camera framerate of 24 frames per second (fps) may be used for movie shoots, a camera framerate of 50/60 fps for broadcast applications, and still higher camera framerates for slow-motion visual effects shots. A shutter speed is selected in conjunction with lens settings such as aperture and, possibly, Neutral Density (ND) filters to achieve a desired exposure level as well as a desired appearance of motion in the scene. The shutter speed may also be described in terms of shutter angle, where 360 degrees corresponds to a full frame period, 180 degrees corresponds to half a frame period, etc. Together, the camera framerate and shutter speed define when the camera shutter is open and sensing light, and when it is closed and not receiving any incoming light. In some embodiments, the open and closed state of the shutter is further defined in conjunction with an external frame synchronization signal. The period when the camera shutter is open may also be referred to as exposure time.

An LED video screen might be viewed by a video camera using any of a range of camera framerates, which may be in the range of 24 fps to 250 fps in some embodiments. In some systems, the PWM output of an LED video screen control system is synchronised with the video framerate of the video camera. However, if such a system ignored the shutter timing, visual artifacts in the captured image might still result. These artifacts might manifest as black bars, dark lines, bright lines, banding or other variation in brightness across the image captured by the video camera. Such artifacts may become more or less apparent depending on a type of lens, settings of the lens, and/or other camera settings. The artifacts may also vary dependent on whether the camera uses a global shutter (in which all pixels in the camera's image sensor are exposed simultaneously) or a rolling shutter (in which lines of the sensor are exposed as the pixels of the line are read). An improved system for PWM control of LED video screens would remove or minimize visible artifacts when the screen is viewed by a camera. A further improvement would be a system controlling an LED screen to be simultaneously viewed by both a camera and a human observer with neither viewer seeing artifacts or flickering.

An LED video screen (and/or its LED panels) may adjust its PWM refresh rate to closely match the incoming video signal timing, with a goal of having an integer number of PWM cycles fitting within a single video frame period. For some systems a single video frame period can be anywhere from around 1/24th to 1/250th of a second. When filming an LED screen, it may further be beneficial to match the video framerate to the camera framerate, and to generator lock (genlock) the two together to ensure both frequency and phase alignment between the two systems. Such a genlock may result in camera frames capturing exactly one video frame.

In some systems, cameras do not operate with their shutters open for the entire frame period. For example, a shutter angle of 180 degree may be used (in a genlocked system, the shutter would be open for half the video frame period), but other shutter angles may be used in other systems. For example, a shutter angle of 172.8 degrees may be used when filming at 24 fps in Europe with incandescent lights, in an attempt to avoid the lights appearing to flicker, resulting in a shutter period of 1/50th of a second for a camera framerate of 24 fps.

Such variations in shutter angle may result in the video camera observing artifacts on the LED video screen, similar to those described above for a system where the shutter speed is not taken into account. Such artifacts are often an interaction between the LED PWM rate, scan-multiplexing of rows of LEDs in the LED video screen or LED panel, and the camera's shutter settings (e.g., camera framerate, global or rolling shutter, and shutter angle). In some systems, such artifacts can be avoided by adjusting the camera shutter settings. In other systems, though, it may not be possible to change the camera settings (for example, due to technical limitations or because changing the shutter speed affects other creative choices such as motion blur).

Figure 1:
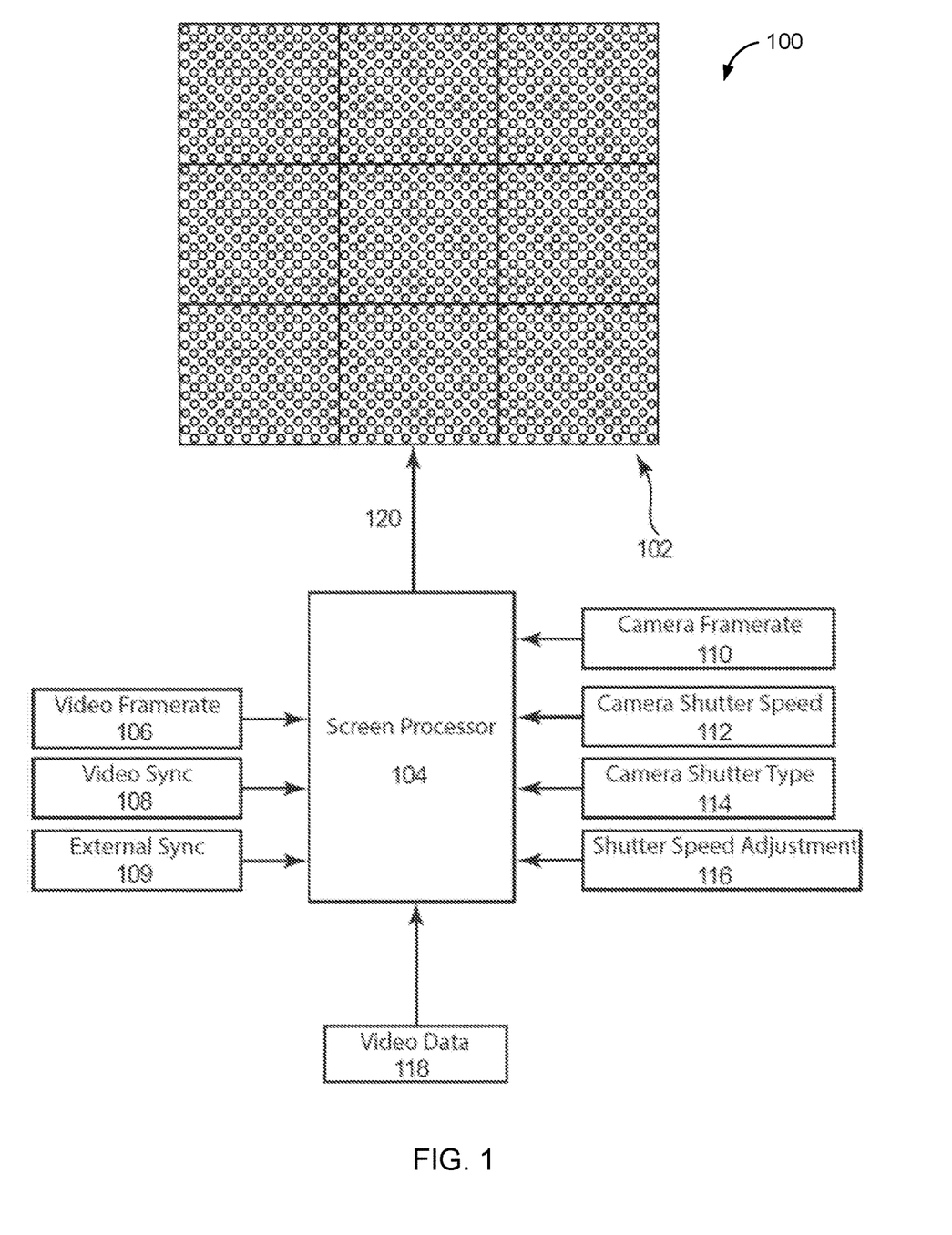
FIG. 1 is a block diagram of a PWM control system according to an embodiment of the disclosure.

FIG. 1 presents a block diagram of a PWM control system 100 according to an embodiment of the disclosure. A video display screen 102 comprises an array of individual pixels where a pixel consists of at least one LED. In some embodiments video display screen 102 comprises a plurality of LED panels that comprise arrays of individual LED pixels. Pixels in either the video display screen 102 or the LED panels may include three colours of LEDs (e.g., red, green, and blue) or any number of LEDs of any number of colours.

The video display screen 102 is controlled by a screen processor 104. Screen processor 104 comprises a control system that sends data to the video display screen 102 indicative of which pixels are to be illuminated and the color and the intensity of those pixels (e.g., PWM control signals). For a video display these values may be updated at rates including, but not limited to, 24, 25, 30, 60, or more times per second. Additionally, video display screen 102 may include internal processing systems capable of further modifying the intensity and color of individual pixels, either in response to commands from the screen processor 104, or autonomously. In embodiments including a plurality of LED panels, individual LED panels may include such an internal processing system. In other embodiments, a video screen includes a single internal processing system for all its LED panels or LEDs.

Screen processor 104 may obtain information relating to video data and camera characteristics relating to a camera that is configured to capture an image displayed by the video display screen 102. The video data may include, but are not limited to, video data 118, video framerate 106, and video sync 108. The camera characteristics may include, but are not limited to, camera framerate 110, camera shutter speed 112, camera shutter type 114, and shutter speed adjustment 116. Video data 118 is data representative of the image that is to be displayed on the video display screen 102. Video framerate 106 is data that is indicative of the framerate of incoming video data 118. For example a video framerate 106 might be 25 fps, or 24 fps. Video sync 108 is a signal or data that is indicative of the start of a video frame from video data 118. The video framerate 106, video sync 108, and video data 118 are collectively referred to herein as video characteristics.

External Sync 109 is a signal or data that is directly or indirectly indicative of the desired phase and frequency of the video display screen 102, which may be different in phase and/or frequency to the video sync 108, and may be related to the camera shutter phase and/or frequency. Such a signal is commonly available and may be called genlock or frame sync, or it may be inferred from a related signal such as a video output signal from the camera.

Camera framerate 110 is data that is indicative of the framerate of the camera that is viewing video display screen 102. Camera shutter speed 112 is data that is indicative of the shutter speed of the camera that is viewing video display screen 102. When described as 'shutter speed' or 'shutter timing,' the characteristic represents an exposure time. When described as 'shutter angle,' the exposure time is a function of both framerate and shutter angle. Camera shutter type 114 is data that is indicative of the shutter type utilized of the camera that is viewing video display screen 102. Example camera shutter types may be global or rolling. The actual camera shutter speed may not precisely match the indicated shutter speed; thus, some form of fine control or adjustment may be provided as shutter speed adjustment 116. This might be in the form of support for high-accuracy, non-integer shutter speeds (e.g. 1/50.0001), or it could be in the form of a separate offset signal specified as an absolute time such as +100 microsecond (μs), or perhaps a fraction of the shutter speed such as +0.01%. The camera framerate 110, camera shutter speed 112, camera shutter type 114, and shutter speed adjustment 116 are collectively referred to herein as camera characteristics.

The characteristics 106, 110, 112, 114, and 116 may be obtained in different ways. For example, in some embodiments, any or all of these characteristics could be provided by the user through a numeric input pad, or through the operation of controls on screen processor 104. In other embodiments, the screen processor 104 may request or read one or more of the characteristics from one or more external data sources. Alternatively, in a further embodiment of the disclosure, any or all of these characteristics (including Video Sync 108 and External Sync 109) could be provided as individual data or synchronization signals. Alternatively, in a yet further embodiment of the disclosure, any or all of these characteristics could be derived from composite data. For example, in some embodiments, the video framerate 106 and video sync 108 may be derived by screen processor 104 from the video data 118. In another embodiment, the camera shutter speed 112 may be derived from signals or a data feed from the camera. In another embodiment, any or all of these characteristics could be inferred, approximated or assumed based on prior knowledge of common operating choices or other such heuristics.

The screen control signal 120 sent from screen processor 104 to video display screen 102 includes PWM control signals for LEDs of video display screen 102. PWM timing, including but not limited to bit depth, frequency, duration, initiation and phase of the desired PWM signals may be generated by screen processor 104 or by systems that are part of video display screen 102. PWM timing is controlled by the screen control signal 120, either explicitly (e.g., by directly specifying PWM timing in sync with the frames of the video data 118), or implicitly (e.g., by specifying a camera exposure time from which PWM timing can be derived by the video display screen 102 from the video data 118). The screen control signal 120 is configured to cause the video display screen 102 to control a brightness of the LEDs with the PWM timing when displaying video data during the period when the shutter of the camera is open.

In some embodiments, sync packets of the screen control signal 120 are configured to provide PWM timing control. The panels lock on to the sync packets, with the result that the screen processor 104 may adjust the frequency and phase of the sync packets to control a time of initiation of the PWM cycle in the video display screen 102. The screen processor 104 may select the frequency of the sync packets based on a setting of a timing reference for the screen processor 104 (e.g. video input or sync input). Between two sync packets, the panel can then start a PWM cycle at a time according to the period that the camera shutter is open (which may be based in turn on the Camera Shutter Speed 112 and, where appropriate the Camera Framerate 110).

In some embodiments, the screen control signal 120 also includes the video data 118. In some such embodiments, video data is transformed from a format received in the video data 118 (e.g. gamma-encoded levels) into another format (e.g., linear brightness levels) prior to inclusion in the screen control signal 120. In some such embodiments the screen processor 104 may adjust the rate at which frames of the video data 118 are transmitted in order to match or maintain some other user-specified relationship with the camera exposure time, such that the exposure time may subsequently be recovered from the timing of the screen control signal 120 and, from that, the necessary timing-related properties of the PWM signals.

In some embodiments, any or all of the video data 118, video framerate 106, video sync 108, external sync 109, camera framerate 110, camera shutter speed 112, camera shutter type 114, shutter speed adjustment 116, and video data 118 may be provided from their respective sources to the video display screen 102 or to its composite LED panels. In some such embodiments, the information is provided to both the screen processor 104 and the video display screen 102. As disclosed above, the PWM control processes described herein may be performed entirely in the screen processor 104, entirely in the video display screen 102, or the screen processor 104 and the video display screen 102 may perform different parts of the processes.

Figure 2A:
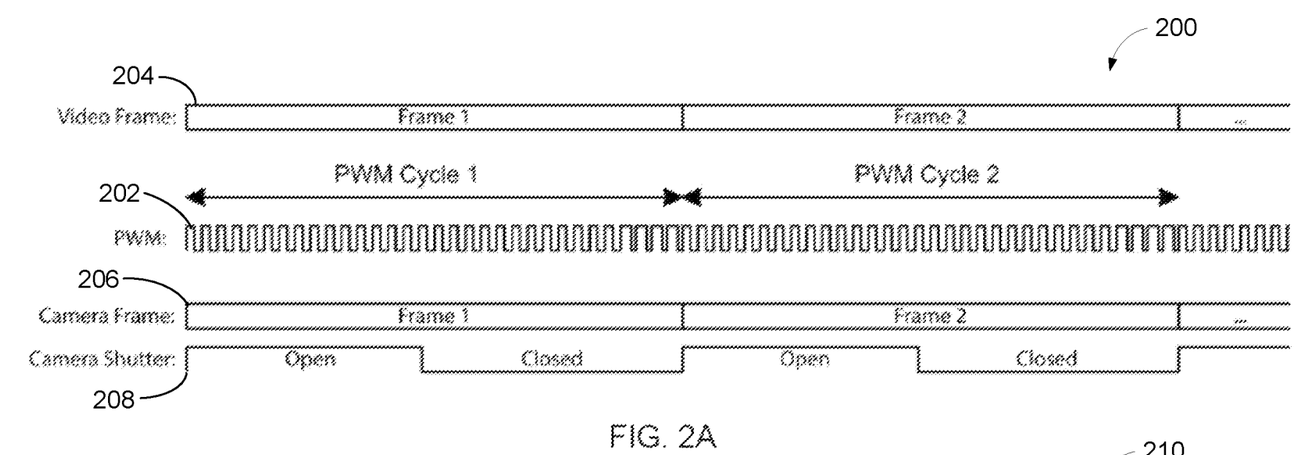
FIG. 2A is an example of video and PWM timing signals.
Figure 2B:
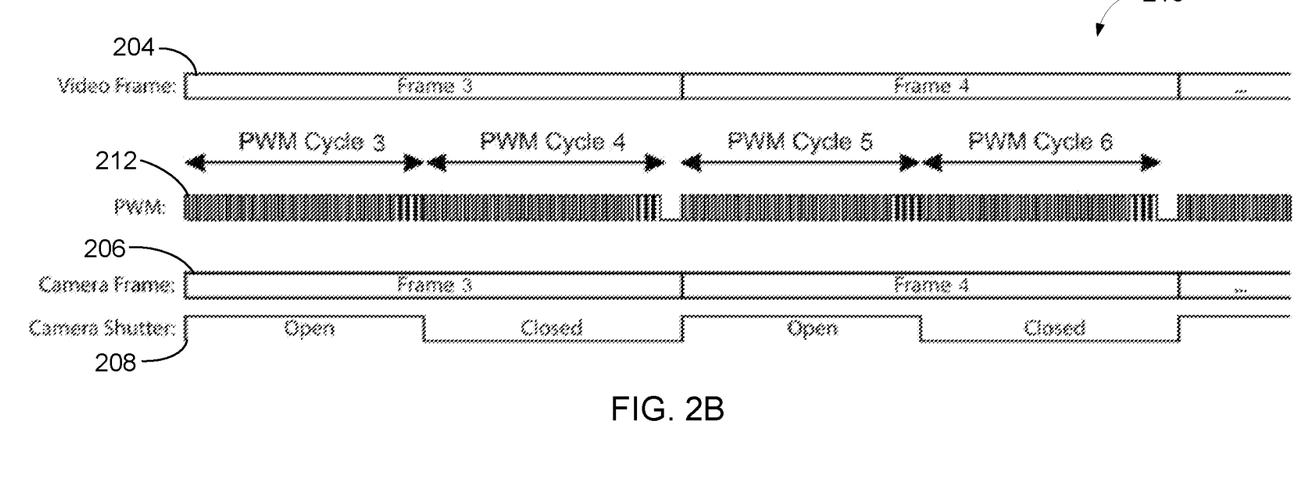
FIG. 2B is an example of video and PWM timing signals according to embodiments of the disclosure.

FIGS. 2A and 2B each present, from top to bottom, the timing of video frames of video data, the timing and alignment of LED PWM, the timing of camera frames, and the timing of a camera shutter.

FIG. 2A is a timing diagram 200 of video and PWM timing signals. A PWM signal 202 (comprising PWM Cycles 1 and 2) is synchronized to a video frame signal 204 (comprising video Frames 1 and 2) which, in turn, is synchronized to a camera frame signal 206 (comprising camera Frames 1 and 2). The PWM cycle 1 lasts for the duration of the video Frame 1 and consists of multiple discrete pulses. The pulse train of the PWM cycle 1 (e.g. its duty cycle or the presence or absence of pulses at certain times of the cycle) may vary during the video Frame 1, depending upon LED driver chips that generate the PWM signal 202. Configuration and control parameters of the LED driver chips cause the chips to generate an overall average duty cycle during the duration of the PWM cycle 1 that achieves a desired brightness level when viewed by eye.

As shown by a camera shutter signal 208 (comprising Open and Closed portions), some of the PWM signal 202 occurs when the camera shutter is closed. For example, PWM Cycle 1 starts when camera Frame 1 starts and the camera shutter is Open. Part way through camera Frame 1, the camera shutter closes but PWM Cycle 1 continues until the end of camera Frame 1.

As discussed above, the LED driver chips that generate the PWM signal 202 may vary the PWM cycle to achieve a specified average duty cycle. In the examples shown in FIGS. 2A and 2B, the PWM cycle changes towards the end of the frame period. This variation in the PWM cycle after the shutter closes in timing diagram 200 is not seen by the camera, resulting in the duty cycle of the signal while the camera shutter is open differing from the average duty cycle over the entire frame period, which can lead to artifacts in the signal captured by the camera.

FIG. 2B is a timing diagram 210 of video and PWM timing signals according to embodiments of the disclosure. The video frame signal 204, the camera frame signal 206, and the camera shutter signal 208 are the same as in FIG. 2A. However, a PWM signal 212 (comprising PWM Cycles 3-6) is increased in speed so that PWM Cycle 3 completes during the exposure time of camera Frame 3, rather than extending through the entire period of camera Frame 3, in order to reduce or eliminate artifacts discussed above, which can result from the open camera shutter capturing only portions of the complete PWM duty cycle.

PWM cycles 3 and 5 start when the camera shutter opens and finish when the camera shutter closes. The camera doesn't capture anything on the video display screen 102 when the shutter is closed. However, if the video display screen 102 remains off while the camera shutter is closed, it could make users, performers, and operators viewing the video display screen 102 uncomfortable, because the video display screen 102 could appear to be flashing on and off. To reduce this effect, in other embodiments of the disclosure PWM cycles 4 and 6 may be started as the shutter closes. Cycles such as PWM cycle 4 will not be viewed by the camera, only by people viewing the video display screen 102.

In further embodiments, to increase the refresh rate of the display, the PWM Cycle 3 has a shorter duration and is repeated during the exposure time, with this set of multiple shorter PWM cycles treated the same as one longer cycle for the purposes of alignment to the camera shutter, thus ensuring all of these shorter PWM cycles are captured in their entirety by the camera, so as to avoid visual artefacts. In some such embodiments, such shorter PWM cycles have a duration that is a unit fraction (i.e., ½, ⅓, ¼, etc.) of the shutter open period, in order to repeat fully during the open period of the camera shutter. In other such embodiments, a set of shorter PWM cycles whose combined durations equal the open period of the camera shutter (e.g., durations of 50%, 25%, and 25% of the open period of the camera shutter). Similarly, a number of shorter PWM cycles may be output during the shutter closed period. In some such embodiments, a different number of PWM cycles are output during the shutter open period than during the shutter closed period.

As described earlier, in some embodiments the shutter speed is determined to a high level of accuracy in order to more closely synchronize the PWM cycle with the shutter. PWM adjustments in the screen control signal 120 that cause the video display screen 102 to lengthen or shorten a duration of the PWM cycle to more closely match such high-precision shutter timing information may include adjusting a PWM clock rate, adjusting a PWM bit depth, extending or shortening one or more portions of the PWM signal where the LEDs are off, truncating the PWM signal before it has completed, and other suitable techniques of precisely adjusting the duration of the PWM cycle.

In embodiments where limitations in the LED driver clock generators of the video display screen 102 prevent achieving a desired duration, PWM adjustments in the screen control signal 120 may cause dithering techniques to be employed across a plurality of PWM cycles corresponding to a plurality of camera shutter open periods. In this way, some PWM cycles of the plurality of PWM cycles have different durations than others, with the result that an average duration of the PWM cycles more closely matches the desired camera shutter open period.

In some cases, such as very fast shutter speeds, it may not be possible to directly fit a complete PWM cycle to the shutter open period, as the resulting PWM clock might exceed the capabilities of the LED driver chips or other elements of the PWM control system 100. In such cases, other embodiments may align a subset of the PWM cycle to the shutter open period, with the subset chosen to minimize visual artefacts, for example by aligning a specific integral number of PWM pulses to the shutter open period (thus avoiding a partial pulse being viewed by the camera at the start or end of the exposure period). In other embodiments, scan-multiplexed driver chips (where multiple scan lines are driven sequentially to form the resulting image) may be controlled to activate each scan line an equal number of times and for the same duration each time during the shutter open period to reduce the likelihood of bright or dark lines being sensed by the camera.

Such embodiments that align a subset of the PWM cycle to the shutter open period may result in a reduction in bit depth, as the full bit depth is typically achieved when viewing the entire PWM cycle, not just a subset of it. In such embodiments, to minimize this effect, the phase of the PWM signal might be adjusted based on a specific PWM implementation within the driver chip, for example to permit the camera to sense a number of shorter pulses as well as a number of longer ones, rather than only the shorter ones. If some reduction in bit depth remains, such embodiments may adjust PWM drive levels sent to the driver chips. For example, the drive level might be artificially boosted (increased) if a number of longer (brighter) pulses will occur while the camera shutter is closed, where such boosting causes additional longer pulses to occur while the camera shutter is open, achieving an LED brightness closer to the desired brightness during the shutter open period. In still other embodiments, reduction in bit depth may additionally or alternatively be compensated for via spatial and temporal dithering or other suitable techniques.

In some embodiments, where the exposure time is less than half the period of the video frame (as shown in FIG. 2B) the video display screen 102 may go dark at the end of the video frame because the PWM cycle 4 has completed and the PWM control system 100 waits for the next video frame to start before initiating the PWM cycle 5. The dark video display screen 102 may not be captured by the camera, because the camera shutter is closed during this period, however the brief dark period of the video display screen 102 may result in flickering when the screen is viewed by eye. In such embodiments, the PWM control system 100 may start driving an additional PWM cycle during the dark period, and then truncate the additional PWM cycle at the start of the next video frame. This can reduce the apparent flickering, especially in brighter areas of the image.

Although the above discussion primarily focuses on global shutter cameras, embodiments of the disclosure may adapt to rolling shutters by providing that the same PWM cycle is repeated at least twice within the video frame period. This has the benefit that, as the camera shutter 'rolls' down the screen, individual sensor lines capture one complete PWM cycle, regardless of the phase at which the sensor line is operating. Thus, in some embodiments the camera shutter type 114 (global or rolling) is either specified by the user, or received by the PWM control system 100 from the camera, to help achieve uniform output. In some such embodiments, specifying or receiving the camera sensor readout speed (how quickly the shutter 'rolls') may enable better results to be obtained, as faster readout speeds result in smaller phase offsets between the top and bottom of the camera sensor. In such embodiments the PWM signal may only continue replicating the start of the frame for a shorter period of time.

As an alternative to the dynamic approach presented here, where information such as shutter angle, sensor type, readout speed, etc. is provided by the user at run time via the user interface or received from a camera or other data sources, embodiments of the disclosure may implement similar functionality 'offline', where a static configuration is pre-generated for a particular type (or types) of LED video screen 102 based on a series of pre-defined shutter angles that might be commonly encountered. Such an approach benefits from reduced run-time complexity, and still provides tuning of the LED PWM output (frequency, phase, waveform shape, etc.) independently of the video framerate based some other specified timing parameter, such as a camera shutter speed.

Some embodiments of PWM control systems according to the disclosure may also send to a user a PWM matching signal indicating how well-tuned the output of the PWM control systems is. Such a signal could be as simple as a 'traffic lights' status indicator, where, in one example, green indicates the entire PWM cycle (or set of PWM cycles) has been adequately matched to the specified shutter timing or shutter open period, amber indicates an integer number of PWM pulses has been matched to the shutter timing (but the entire PWM cycle couldn't be matched for some reason, with the result that some reduction in effective bit depth may occur), and red indicates that it was not possible to tune the PWM output for the specified shutter timing (for example if the shutter speed is so fast that even a single PWM pulse can't be completed for all scan-lines).

In some embodiments of the disclosure, the camera framerate 110 does not match the video framerate 106, for example where high-speed cameras are being used with a video screen displaying regular-speed video content, for example at a sporting event where the cameras are high-speed in order to provide clean images of the fast-moving action, and to allow slow motion replays, while the video displays on billboards, scoreboards, or action replay screens are operating at normal video framerates. High-speed cameras typically operate with faster shutter speeds than regular cameras, and so are more likely to exhibit flickering and other artifacts if the LED display screen isn't appropriately tuned for them. In such embodiments, the user may specify the camera framerate 110. The PWM control system 100 of such embodiments would then use both the camera framerate 110 and the camera shutter speed 112 to better match the PWM timing to a single shutter exposure period, as well as to subsequent shutter exposure periods within the same video frame period.

In some embodiments, the PWM control system 100 determines suitable timing information indirectly, for example by monitoring a video output from the camera and detecting any visual artifacts that are present in the camera video output. Such embodiments may adjust the PWM timing of the LED video display screen 102 until the visibility of such artifacts (if any) is minimized in the camera video signal. Such adjustment may be determined while displaying regular video content on the LED video display screen 102, or while displaying specially designed test patterns. Some such embodiments use a separate test setup to measure the camera characteristics (for example, in an optical lab) to determine the necessary adjustment information.

In other embodiments, the 'on-time' of the PWM control system 100 is adjusted to control the effect of motion blur and/or strobing of fast-moving objects moving in front of the LED video display screen 102. Such objects are visible in silhouette, but only while the LEDs are lit. Such embodiments may, based on user input, increase or decrease the duration of the PWM cycle independent of the video framerate in order to increase or decrease respectively the amount of motion blur so that it either looks natural, or has been eliminated, depending on the user input.

Still other embodiments may support timing information from multiple cameras, with the PWM control system 100 optimizing its settings as possible to accommodate all the cameras. The accommodation may be weighted to favor one or more cameras over others, according to user input indicating the importance of various cameras. Multiple cameras could operate at various different camera framerates and/or shutter speeds, as might be encountered with a mix of high-speed and regular speed cameras.

In some circumstances, the video image to be displayed during each camera's exposure period might be identical, such as when using high-speed and regular speed cameras together. In such examples, the PWM control system 100 considers all cameras' exposure periods, and finds a 'best fit' solution based on these constraints. For example, a regular speed camera with an exposure time of 16.7 milliseconds (ms) and a high speed camera with an exposure time of 2 ms might require the PWM output to operate at a frequency of 500 Hertz (Hz) (to match the shorter 2 ms exposure time), with multiple PWM cycles aligned to occur during the regular camera's longer 16.7 ms exposure time—likely 8 repetitions to total 16 ms, with an additional 0.7 ms of 'off time' inserted to make up the full 16.7 ms period, rather than a $9^{th}$ repetition which would need to be truncated, thereby causing visible artefacts. In this way, artefacts on both cameras may be minimized.

In other circumstances, the video image displayed for a first camera might be different than that displayed for a second camera (e.g., a tracking camera). In one such example, the PWM control system 100 displays a first video image during a primary camera's exposure period, and a second video image comprising a machine-readable tracking pattern during a tracking camera's exposure period (e.g., when the primary camera's shutter is closed). In embodiments adapted for such circumstances, the technique described herein may be applied to minimize artefacts on both cameras, as such artefacts can both detract from the image quality visible to the primary camera or a human viewer, as well as cause problems in the tracking camera's use of the machine-readable patterns.

Although this disclosure refers to LED video display screens, it should be understood that the disclosure is not so limited and that in other embodiments the PWM control system 100 may be used with other video display types to control screen brightness using PWM without producing artifacts apparent to viewers of the display. Such other video display types include organic LEDs (OLEDs), microscopic LEDs (microLEDs), liquid crystal displays (LCDs), plasma displays, and other such light emitting devices. In still other embodiments, the PWM control system 100 may be used with projection video displays, such as Digital Light Processing (DLP) projectors, Liquid Crystal on Silicon (LCoS) projectors, and laser projectors.

Figure 3:
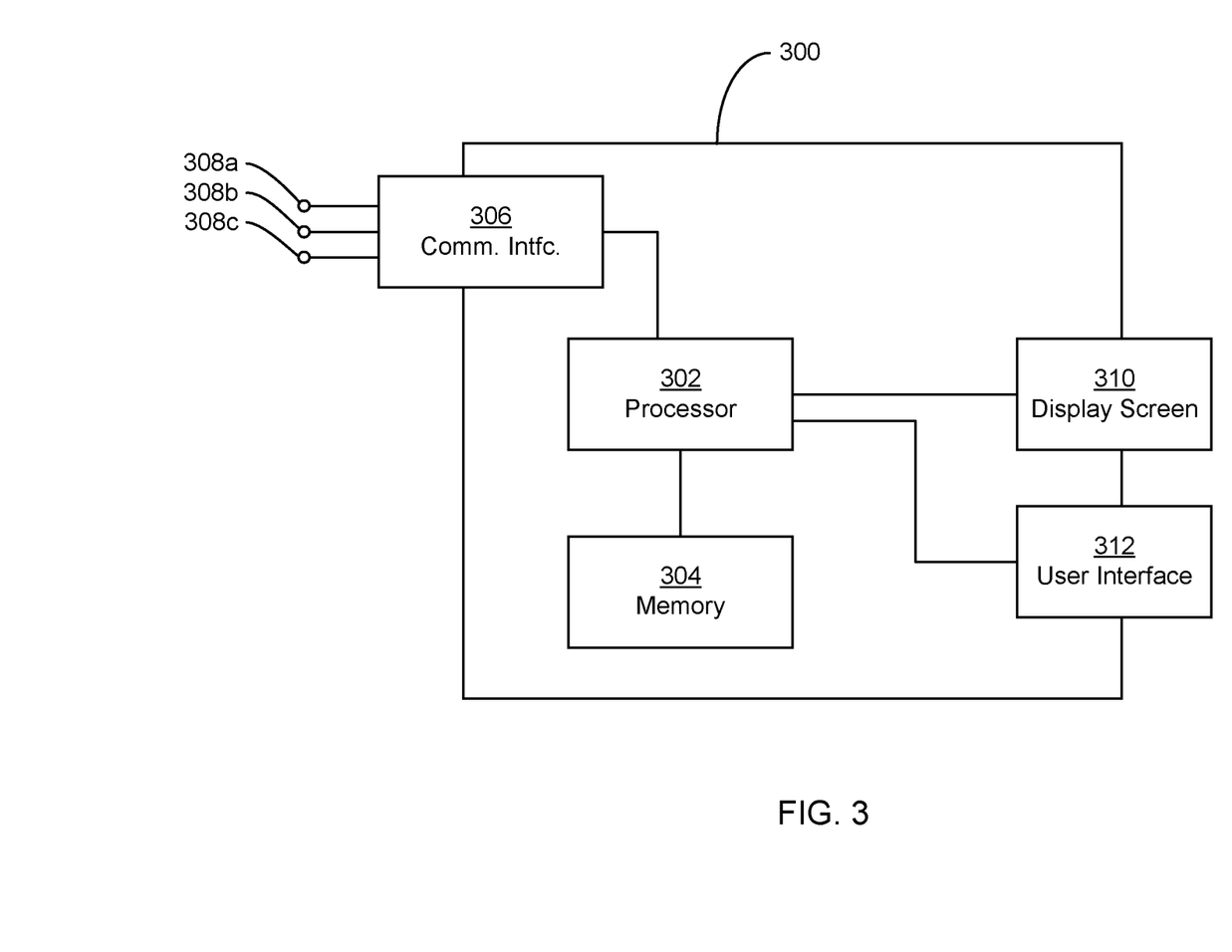
FIG. 3 is a block diagram of a controller for use in a PWM control system according to an embodiment of the disclosure.

FIG. 3 is a block diagram of a controller 300 for use in a PWM control system 100 according to the disclosure. The controller 300 is suitable for use in the screen processor 104, the video display screen 102, and LED panels of the video display screen 102. The controller 300 includes a processor 302 electrically coupled to a memory 304. The processor 302 is implemented by hardware and software. The processor 302 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 302 is further electrically coupled to and in communication with a communication interface 306, a user display screen 310, and a user interface 312. The communication interface 306 is configured to receive a video signal (such as video data 118) via one or more communication links 308*a*. The communication interface 306 also is configured to communicate with external devices for control purposes via one or more Ethernet or other digital communication links 308b. Such control data may include video framerate 106, video sync 108, external sync 109, camera framerate 110, camera shutter speed 112, camera shutter type 114, and shutter speed adjustment 116. The communication interface 306 also is configured to send and/or receive video display or LED panel control signals (such as screen control signal 120) via one or more additional Ethernet or other digital communication links 308c. Some of links 308a, 308b and 308c may optionally share a single physical connection. In other embodiments, the video signal, control data, and video data may be combined or separated into fewer or more than three communication links.

The processor 302 is configured to display system information to a user via the user display screen 310 and to output and receive user control information via the user interface 312. While the controller 300 includes the user display screen 310 and the user interface 312, other embodiments do not include a user display screen and user interface, and user control information may be sent and received via one or more of the Ethernet communication links 308b or other suitable communication link.

The controller 300 is suitable for implementing processes, PWM matching control, and other functionality as disclosed herein, which may be implemented as instructions stored in the memory 304 and executed by the processor 302.

The memory 304 comprises one or more disks, tape drives, and/or solid-state drives and may be used as an over-flow data storage device, to store programs when such programs are selected for execution, and to store instructions and data that are read during program execution. The memory 304 may be volatile and/or non-volatile and may be read-only memory (ROM), random access memory (RAM), and/or static random-access memory (SRAM). The memory 304 is configured to store software or firmware comprising instructions that, when executed by the processor 302, provide the PWM matching functionality described herein.

Figure 4:
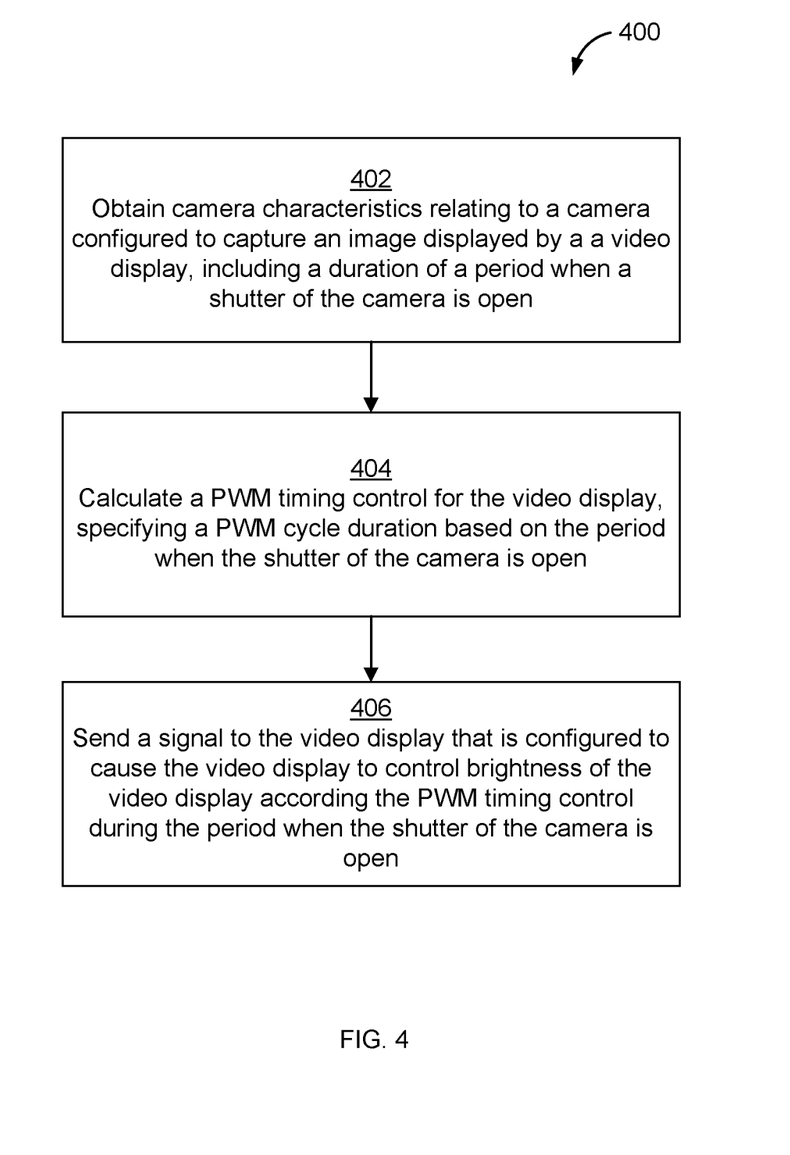
FIG. 4 is a flow diagram of a method of controlling PWM in a video display according to an embodiment of the disclosure.

FIG. 4 is a flow diagram of a method 400 of controlling PWM in a video display according to an embodiment of the disclosure. Referring to elements shown in FIGS. 1, 2B, and 3, the method 400 is suitable for use by the controller 300 of the screen processor 104 in controlling the PWM of LED pixels in video display screen 102. The processor 302 executes instructions stored in the memory 304 to perform the method 400.

In step 402, the screen processor 104 obtains camera characteristics that relate to a camera that is configured to capture an image displayed by the LED video display screen 102. The camera characteristics include a duration of a period when a shutter of the camera is open. In step 404, the screen processor 104 calculates a PWM timing control for the LED video display screen 102. The PWM timing control specifies a PWM cycle duration based on the period when the shutter of the camera is open. In step 406, the screen processor 104 sends the screen control signal 120 to the LED video display screen 102. The screen control signal 120 is configured to control a brightness of the LED video display screen 102 according to the PWM timing control during the period when the shutter of the camera is open.

As used herein, the term 'PWM control system' refers to a system according to the disclosure that matches PWM control of a video display to operational characteristics of one or more video cameras. In various embodiments, elements of a PWM control system according to the disclosure may include the screen processor 104 and internal processing systems in the video display screen 102 and/or their LED panels (if any). In various embodiments, processing attributed to the PWM control system according to the disclosure may be performed in a single element of the system or be distributed across multiple elements of the system.

While only some embodiments of the disclosure have been described herein, those skilled in the art, having benefit of this disclosure, will appreciate that other embodiments may be devised which do not depart from the scope of the disclosure. While the disclosure has been described in detail, it should be understood that various changes, substitutions and alterations can be made hereto without departing from the spirit and scope of the disclosure.

What is claimed is:

1. A pulse width modulation (PWM) control system comprising:
a memory configured to store instructions; and
a processor coupled to the memory and configured to execute instructions stored in the memory to:
obtain camera characteristics relating to a camera that is configured to capture an image displayed by a video display, the camera characteristics comprising a duration of a period when a shutter of the camera is open;
calculate a PWM timing control for the video display, the PWM timing control specifying a PWM cycle duration based on the period when the shutter of the camera is open; and
send a signal to the video display, the signal including the PWM timing control and configured to cause the video display to control a brightness of the video display according to the PWM timing control during the period when the shutter of the camera is open.

2. The PWM control system of claim 1, wherein
the PWM timing control is a first PWM timing control and the PWM cycle duration is a first PWM cycle duration,
the processor is configured to execute the instructions stored in the memory to calculate a second PWM timing control specifying a second PWM cycle duration based on the period when the shutter of the camera is closed, and
the signal further includes the second PWM timing control and is further configured to cause the video display to control the brightness of the video display according to the second PWM timing control during the period when the shutter of the camera is closed.

3. The PWM control system of claim 1, wherein the signal includes an indication of a time of initiation of the PWM cycle.

4. The PWM control system of claim 1, wherein the PWM cycle duration specified by the PWM timing control is less than the duration of the period when the shutter of the camera is open.

5. The PWM control system of claim 1, wherein the signal further includes a PWM adjustment.

6. The PWM control system of claim 5, wherein the PWM adjustment is configured to cause the video display to lengthen or shorten the PWM cycle duration by one of adjusting a PWM clock rate, adjusting a PWM bit depth, extending or shortening one or more periods where the video display is off in the PWM cycle, and truncating the PWM cycle before it has completed.

7. The PWM control system of claim 1, wherein the PWM timing control is a first PWM timing control, the PWM cycle duration is a first PWM cycle duration, the signal is a first signal, the period when the shutter of the camera is open is a first period, and the processor is configured to execute the instructions stored in the memory to:
calculate a second PWM timing control for the video display, the second PWM timing control specifying a second PWM cycle duration, where an average value of the first PWM cycle duration and the second PWM cycle duration more closely matches the duration of the first period when the shutter of the camera is open than does the first PWM cycle duration; and send a second signal to the video display, the second signal including the second PWM timing control and configured to cause the video display to control the brightness of the video display according to the second PWM timing control during a second period when the shutter of the camera is open.

8. The PWM control system of claim 1, wherein the camera characteristics further comprise a camera shutter type, and the processor is configured to execute the instructions stored in the memory to calculate the PWM timing control further based on the camera shutter type.

9. The PWM control system of claim 1, wherein the processor is configured to execute the instructions stored in the memory to send to a user of the PWM control system a PWM matching signal configured to indicate how closely the PWM cycle duration matches the period when the shutter of the camera is open.

10. The PWM control system of claim 1, wherein the camera characteristics is a first camera characteristics relating to a first camera, comprising a first duration of a first period when the shutter of the first camera is open, and the processor is configured to execute the instructions stored in the memory to:

obtain a second camera characteristics relating to a second camera configured to capture the image displayed by the video display, the second camera characteristics comprising a second duration of a second period when a shutter of the second camera is open; and calculate the PWM timing control based on both the first camera characteristics and the second camera characteristics.

11. A method of controlling pulse width modulation (PWM) in a video display, the method comprising:

obtaining, by a control system, camera characteristics relating to a camera that is configured to capture an image displayed by the video display, the camera characteristics comprising a duration of a period when a shutter of the camera is open;

calculating, by the control system, a PWM timing control for the video display, the PWM timing control specifying a PWM cycle duration based on the period when the shutter of the camera is open; and sending, by the control system, a signal to the video display, the signal configured to cause the video display to control a brightness of the video display according to the PWM timing control during the period when the shutter of the camera is open.

12. The method of claim 11, wherein the PWM timing control is a first PWM timing control and the PWM cycle duration is a first PWM cycle duration, the method further comprising:

calculating by the control system a second PWM timing control specifying a second PWM cycle duration based on the period when the shutter of the camera is closed, wherein the signal further includes the second PWM timing control and is further configured to cause the video display to control the brightness of the video display according to the second PWM timing control during the period when the shutter of the camera is closed.

13. The method of claim 11, wherein the signal includes an indication of a time of initiation of the PWM cycle.

14. The method of claim 11, wherein the PWM cycle duration specified by the PWM timing control is less than the duration of the period when the shutter of the camera is open.

15. The method of claim 11, wherein the signal further includes a PWM adjustment.

16. The method of claim 15, wherein the PWM adjustment is configured to cause the video display to lengthen or shorten the PWM cycle duration by one of adjusting a PWM clock rate, adjusting a PWM bit depth, extending or shortening one or more periods where the video display is off in the PWM cycle, and truncating the PWM cycle before it has completed.

17. The method of claim 11, wherein the PWM timing control is a first PWM timing control, the PWM cycle duration is a first PWM cycle duration, the signal is a first signal, the period when the shutter of the camera is open is a first period, the method further comprising:

calculating by the control system a second PWM timing control for the video display, the second PWM timing control specifying a second PWM cycle duration, where an average value of the first PWM cycle duration and the second PWM cycle duration more closely matches the duration of the first period when the shutter of the camera is open than does the first PWM cycle duration; and sending by the control system a second signal to the video display, the second signal including the second PWM timing control and configured to cause the video display to control the brightness of the video display according to the second PWM timing control during a second period when the shutter of the camera is open.

18. The method of claim 11, wherein the camera characteristics further comprise a camera shutter type, the method further comprising calculating the PWM timing control further based on the camera shutter type.

19. The method of claim 11, the method further comprising sending by the control system to a user of the control system a PWM matching signal configured to indicate how closely the PWM cycle duration matches the period when the shutter of the camera is open.

20. The method of claim 11, wherein the camera characteristics is a first camera characteristics relating to a first camera, comprising a first duration of a first period when the shutter of the first camera is open, the method further comprising:

obtaining by the control system a second camera characteristics relating to a second camera configured to capture the image displayed by the video display, the second camera characteristics comprising a second duration of a second period when a shutter of the second camera is open; and calculating by the control system the PWM timing control based on both the first camera characteristics and the second camera characteristics.

* * * * *